(12) United States Patent
Bihannic et al.

(10) Patent No.: US 12,101,248 B2
(45) Date of Patent: Sep. 24, 2024

(54) METHOD FOR MONITORING A DATA STREAM ASSOCIATED WITH A PROCESS WITHIN A SHARED NETWORK

(71) Applicant: Orange, Issy-les-Moulineaux (FR)

(72) Inventors: Nicolas Bihannic, Chatillon (FR); Jean-Michel Cornily, Chatillon (FR)

(73) Assignee: ORANGE, Issy-Les-Moulineaux (FR)

( * ) Notice: Subject to any disclaimer, the term of this patent is extended or adjusted under 35 U.S.C. 154(b) by 0 days.

(21) Appl. No.: 17/764,864

(22) PCT Filed: Sep. 24, 2020

(86) PCT No.: PCT/FR2020/051663
§ 371 (c)(1),
(2) Date: Mar. 29, 2022

(87) PCT Pub. No.: WO2021/064310
PCT Pub. Date: Apr. 8, 2021

(65) Prior Publication Data
US 2022/0345399 A1  Oct. 27, 2022

(30) Foreign Application Priority Data

Sep. 30, 2019  (FR) ...................................... 1910780

(51) Int. Cl.
*H04L 45/00* (2022.01)
*H04L 43/0882* (2022.01)
*H04L 45/24* (2022.01)

(52) U.S. Cl.
CPC .......... *H04L 45/38* (2013.01); *H04L 43/0882* (2013.01); *H04L 45/24* (2013.01)

(58) Field of Classification Search
None
See application file for complete search history.

(56) References Cited

U.S. PATENT DOCUMENTS

| 9,246,827 B1* | 1/2016 | Orr ..................... H04L 47/2441 |
| 10,742,672 B2* | 8/2020 | Yermakov ........... H04L 63/1425 |
| 2008/0298300 A1 | 12/2008 | Mousset et al. |

(Continued)

FOREIGN PATENT DOCUMENTS

| WO | 2006045497 A1 | 5/2006 |
| WO | 2016074738 A1 | 5/2016 |
| WO | 2019106308 A1 | 6/2019 |

OTHER PUBLICATIONS

International Search Report dated Nov. 6, 2020 for corresponding International Application No. PCT/FR2020/051663, Sep. 24, 2020.
(Continued)

*Primary Examiner* — Joshua Joo
(74) *Attorney, Agent, or Firm* — David D. Brush; Westman, Champlin & Koehler, P.A.

(57) ABSTRACT

A method for controlling a flow of data associated with a process and routed in a shared data path, including a plurality of flows, of a communication network. The method is implemented in a device of the path and includes: receiving, from a supervision entity, information identifying the flow to be controlled; configuring at least one flow control parameter, the parameter relating to the process corresponding to the received information; and executing an operation of controlling the data flow on the basis of at least one configured parameter.

14 Claims, 8 Drawing Sheets

(56) References Cited

U.S. PATENT DOCUMENTS

| | | | | |
|---|---|---|---|---|
| 2009/0241170 | A1* | 9/2009 | Kumar | H04L 47/2458 |
| | | | | 370/235 |
| 2012/0155264 | A1* | 6/2012 | Sharma | H04L 47/6215 |
| | | | | 370/232 |
| 2018/0295036 | A1* | 10/2018 | Krishnamurthy | H04L 43/026 |
| 2019/0036779 | A1* | 1/2019 | Bajaj | H04L 41/0816 |
| 2019/0150158 | A1* | 5/2019 | Farmanbar | H04W 24/08 |
| | | | | 370/329 |
| 2020/0007449 | A1* | 1/2020 | Morin | H04L 69/22 |
| 2020/0037214 | A1* | 1/2020 | Jin | H04W 28/0268 |
| 2020/0351718 | A1* | 11/2020 | Dong | H04W 28/0252 |
| 2020/0389527 | A1 | 12/2020 | Fromentoux et al. | |
| 2021/0045016 | A1* | 2/2021 | Dong | H04W 28/0252 |
| 2021/0084523 | A1* | 3/2021 | Kucera | H04W 28/06 |
| 2021/0112460 | A1* | 4/2021 | Fujishiro | H04W 48/18 |
| 2021/0336891 | A1* | 10/2021 | Lawrence | H04L 47/28 |
| 2022/0038353 | A1* | 2/2022 | Yadav | H04L 43/0829 |
| 2022/0038943 | A1* | 2/2022 | Hu | H04W 28/0268 |
| 2022/0261273 | A1* | 8/2022 | Gunda | G06F 21/55 |
| 2022/0337706 | A1* | 10/2022 | Kotecha | H04M 15/8016 |
| 2024/0163938 | A1* | 5/2024 | Qiao | H04W 16/02 |

OTHER PUBLICATIONS

Written Opinion of the International Searching Authority dated Nov. 6, 2020 for corresponding International Application No. PCT/FR2020/051663, filed Sep. 24, 2020.

English translation of the Written Opinion of the International Searching Authority dated Nov. 16, 2020 for corresponding International Application No. PCT/FR2020/051663, filed Sep. 24, 2020.

\* cited by examiner

METHOD FOR MONITORING A DATA STREAM ASSOCIATED WITH A PROCESS WITHIN A SHARED NETWORK

CROSS-REFERENCE TO RELATED APPLICATIONS

This Application is a Section 371 National Stage Application of International Application No. PCT/FR2020/051663, filed Sep. 24, 2020, which is incorporated by reference in its entirety and published as WO 2021/064310 A1 on Apr. 8, 2021, not in English.

1. TECHNICAL FIELD

The invention relates to identifying and routing process data within a communication network, in particular structured into data paths having for example common quality of service, security and routing characteristics. This involves for example managing flows associated with specific services in a network comprising network slices.

2. PRIOR ART

Businesses, in particular in the industrial sector, in the context of digitizing their business processes, desire widespread integration of mechanisms for controlling the performance of their connectivity services with the mechanisms inherent to the processes of their business. The process is defined as a set of tasks that make it possible to monitor the implementation and the quality of service that is provided or the product that is delivered.

The product or service that is delivered is becoming increasingly customized, specific to a client or to a set of clients, requiring appropriate monitoring of the process of implementing the product or service.

A process may require the involvement of multiple parties. For example, one (or more) supplier(s) of industrial equipment, one (or more) supplier(s) of connectivity services, one (or more) supplier(s) of business applications, one (or more) supplier(s) of cloud infrastructures or even a process integrator involving the various parties cited above may thus be involved in implementing the process.

A process may furthermore comprise a diversity of services that are able to be executed simultaneously or successively. The process may for example require group calls between workers within production lines, IoT (for "Internet of Things") communications for collecting operating information from machines or even transmissions of application data to clients receiving the product or the service resulting from the process. Each of these services, associated with the process, has different connectivity needs in terms of volume, tolerance to packet loss, responsiveness, for example to piloting commands, and highly different supervision requirements depending on their criticality level. 5G (Fifth Generation) technology should make it easier to implement these requirements, in particular through the support of data routing services that are specific to each of the services cited above. Network slices implemented in 5G technology are in particular deployed to route data having common characteristics in terms of quality of service, security and management. Separate processes requiring the same connectivity characteristics will thus have their data routed within one and the same network slice. Therefore, the data flows of a process that correspond to separate services will probably be routed on different network slices. Indeed, the operator of the communication service organizes its communication network by routing all data having common characteristics from the point of view of the network but possibly relating to separate clients in one and the same network slice. The operator deploys for example one network slice for IoT data, one network slice for highly critical data, and one network slice for best effort data. The network operator furthermore administers its network in line with its own needs and deploys mechanisms for managing and monitoring traffic on a network slice according to its own constraints. The business in charge of the process does not have any supervision information that is dynamically configured and specific to its process, and is therefore not able to supervise and adapt the control of the process, for example in order to modify the process in question on the basis of this control. The network architectures and the supervision solutions also do not make it possible to quickly detect a problem that may arise on one of the services forming the process, complicating and delaying the decisions taken to solve the problem. The present invention aims to provide improvements over the prior art.

3. Disclosure of the Invention

The invention aims to improve the situation by way of a method for controlling a flow of data associated with a process and routed in a shared data path, comprising a plurality of flows, of a communication network, said method being implemented in a device of said path and comprising receiving, from a supervision entity, information identifying the flow to be controlled, configuring at least one flow control parameter, said parameter relating to the process corresponding to the received information, and executing an operation of controlling the data flow on the basis of at least one configured parameter.

The method makes it possible to be able to differentiate between the options for supervising a flow within a shared data path. According to the prior art, the data path is supervised uniformly for all of the data of the path, that is to say that the data of the various flows within the path are controlled with the same characteristics or control parameters. In the network architectures that are implemented, the flows of one and the same data path may have the same routing parameters, that is to say that the data of the flows are routed in accordance with comparable quality of service and security criteria.

However, depending on the nature of these flows and in particular of the processes associated with the various flows, the control of one flow may have to differ from the control of another flow, associated with another process, and also require implementation of the control method. Indeed, the method makes it possible to be able to dynamically configure control parameters for a specific data flow within a shared (or pooled) data path, thus making it possible to improve the supervision of the process. Indeed, it is thus possible to dynamically modify the control parameters of a flow, to provide for a feedback of supervision information adapted to the flow and to analyze specific characteristics of the data according to type, criticality in terms of availability, requirements in terms of quality of service of a process whose data are transmitted in a data path, for example using methods for multiplexing and/or structuring into network slices.

According to one aspect of the invention, in the control method, the shared data path corresponds to a network slice.

In network architectures that are currently being specified, for example 5G (Fifth Generation) ones, data flows are routed in network slices. The data of a network slice are routed in accordance with common routing characteristics, and the method makes it possible to customize the type of supervision of a flow, in particular within a network slice comprising a plurality of data flows, possibly corresponding to separate processes.

According to another aspect of the invention, in the control method, the information identifying the flow comprises a process identifier, and optionally at least one identifier from among an identifier of the shared data path, an identifier of the device, and an identifier of the supervision entity.

A flow may advantageously be identified by a process identifier identifying a process with which it is associated in order to facilitate the use and the association of the received control data. The process identifier may be supplemented by a data path identifier, for example a network slice identifier, in the knowledge that data of one and the same process may be routed on different data paths, depending for example on their requirement in terms of quality of service. If some data of a process have to transit via a specific device, for example for security reasons, an identifier of the device may be used in addition to the process identifier and optionally the identifier of a data path. An identifier of the supervision entity may furthermore be used as identifier in addition to the process identifier, in particular in order to verify that the supervision entity actually corresponds to the process to be controlled.

According to another aspect of the invention, in the control method, the at least one flow control parameter is obtained from the supervision entity prior to the device configuring said parameter.

The supervision entity may advantageously transmit the one (or more) flow control parameter(s) in addition to the identifier of the flow to be supervised. These two items of information may be transmitted at the same time or separately. In particular, if the supervision entity wishes to dynamically modify the control parameter in order to improve the monitoring of the process, a specific sending of the one (or more) control parameter(s) may be transmitted in order to modify the parameter, while data of the flow are routed in the shared path.

According to another aspect of the invention, in the control method, at least one flow control parameter comprises at least one parameter from among:
a field of a datum of the flow,
a period for which the flow control is executed,
a frequency corresponding to the number of iterations of the control operation per time unit,
a mode of computing the control data,
the type of interface used to perform the control operation,
a datum for synchronizing control operations.

The control parameter may make it possible to evaluate a specific field of a datum of the flow, for example a field relating to the quality of service. It may be advantageous to indicate a control duration if the control operation is performed for a limited duration, meeting a specific need or detection of an incident in the implementation of the process. It is possible to collect control data at specific intervals depending in particular on the type of process to be controlled. A process requiring high availability requires for example a higher frequency. The computing mode corresponds for example to computing an average value of a controlled datum or else to computing an instantaneous value. The type of interface may depend on the control type and frequency. A streaming interface on the device is thus preferred in order to frequently feed back data, while a file transfer interface is more suitable for less frequent feedback of control data. In particular if multiple data flows relating to a process are controlled, adding a synchronization datum, such as a clock, makes it possible to correlate the various operations and to be able to interpret the results of control operations performed on the various flows. The synchronization datum furthermore makes it possible to monitor the evolution of the results of the control operations over time.

According to another aspect of the invention, the control method furthermore comprises transmitting a result of the executed control operation to the supervision entity.

Once the control operation has been performed on the identified flow and in accordance with the configured control parameter, the device transmits a result of the performed control operation to the supervision entity, allowing the supervision entity to make a decision based on the result. The decision may for example consist in requiring the data flow of the process to be routed on another data path or the data flow to be supervised in accordance with another control parameter.

According to another aspect of the invention, the control method furthermore comprises receiving, from another device of the data path, a message comprising information taken into account by the device in order to configure the control parameter.

A process more often than not involves a plurality of devices able to exert control over the data flow. A second device, or even multiple other devices, may influence the control exerted by a first device, for example by transmitting a result of a control operation and thus modify a control parameter of the first device. This makes it possible to perform distributed and coordinated control of the process on multiple devices, each of these devices being able to exert control over some or certain data of the process. These devices may act on one and the same data path or on multiple data paths.

According to another aspect of the invention, in the control method, the control operation comprises an operation of correlating a result of a control operation performed on a second data flow with a result from the control operation on the data flow.

A process may be associated with multiple data flows, each of the flows being for example established in order to transport data having the same routing characteristics. A process may comprise for example a real-time data flow and a "best effort" data flow, or "audio" and "video" data flows, the two flows being routed on one and the same shared data path or two separate data paths. The control operation may consist in obtaining data resulting from the control of each flow and an operation of correlating the various received data so as then to transmit a result of the control of the process to the supervision entity or to another entity.

According to another aspect of the invention, in the control method, the second data flow of the correlation operation is routed in a control plane of the communication network and the data flow is routed in the transfer plane of the communication network.

It is advantageous to be able to both control the data of a process that are transmitted in the control plane in addition to the control operation performed on the data transmitted in the transfer plane in order to identify problems arising on a process. The control operations of establishing a connection or domain name resolution DNS ("domain name system"), performed in the control plane, may indeed advantageously be used in addition to the flow control in the transfer plane in order to detect anomalies or problems on a process, these anomalies being able to arise indiscriminately when establishing or when managing a flow, such as in the transmission of the data of the flow in the transfer plane.

According to another aspect of the invention, in the control method, the data flow is transmitted in a network slice established in the shared data path. A network slice makes it possible to perform processing operations specific to flows having common routing characteristics. A data flow of a process may be transmitted in a network slice, this network slice itself possibly being contained within a network slice if the shared data path is a network slice. The data flow control operation may correspond to a specific processing operation associated with the network slice associated with the process. A network sub-slice may thus have specific control parameters inherent to a process within a network slice having generic control parameters independent of the data of the processes routed in this slice. This configuration is directly applicable in the context of a wholesale offering, in which the operator, subscribing to this wholesale offering, implements network sub-slices.

According to another aspect of the invention, the control method furthermore comprises reconfiguring at least one parameter following the execution of the operation of controlling the data flow.

The method makes it possible to be able to reconfigure a control parameter following the execution of the control operation, and thus to be able to adapt the control operation on the basis in particular of the first results obtained once the control operation has been initialized. Thus, depending on the obtained results, it may be useful to control other parameters of the flow or to modify the parameter that is initially controlled, and thus improve, deepen or diversify the control operation that is performed.

The various aspects of the control method that have just been described may be implemented independently of one another or in combination with one another.

The invention also relates to a control device for controlling a flow of data associated with a process and routed in a shared data path, comprising a plurality of flows of a communication network, implemented in a device of said path and comprising
  a receiver, able to receive, from a supervision entity, information identifying the flow to be controlled,
  a configuration module able to configure a flow control parameter, said parameter relating to the process corresponding to the received information,
  a controller, able to execute an operation of controlling the data flow on the basis of the configured parameter.

This device, which is able, in all of its embodiments, to implement the control method that has just been described, is intended to be implemented in an entity of a communications infrastructure, in a virtualized infrastructure or in an infrastructure based on physical equipments. For example, the device may be implemented in a network equipment entity, such as a router or application server.

The invention also relates to a control system for controlling a flow of data associated with a process and routed in a shared data path, comprising a plurality of flows, of a communication network, the system comprising:
  a control device,
  a supervision entity able to transmit information identifying the flow to be controlled to the control device.

The invention also relates to a computer program comprising instructions for implementing the steps of the control method that has just been described when this program is executed by a processor, and a recording medium able to be read by a control device and on which the computer program is recorded.

This program may use any programming language and be in the form of source code, object code or intermediate code between source code and object code, such as in a partially compiled form, or in any other desirable form.

The invention also targets a computer-readable information medium comprising instructions of the computer program as mentioned above. The information medium may be any entity or device capable of storing the programs. For example, the medium may comprise a storage means, such as a ROM, for example a CD-ROM or a microelectronic circuit ROM, or else a magnetic recording means, for example a hard disk.

Moreover, the information medium may be a transmissible medium such as an electrical or optical signal, which may be routed via an electrical or optical cable, by radio or by other means. The program according to the invention may in particular be downloaded from an Internet network.

As an alternative, the information medium may be an integrated circuit in which the program is incorporated, the circuit being designed to execute or to be used in the execution of the method in question.

4. BRIEF DESCRIPTION OF THE DRAWINGS

Other features and advantages of the invention will become more clearly apparent upon reading the following description of particular embodiments, given by way of simple illustrative and nonlimiting examples, and the appended drawings, in which.

5. DESCRIPTION OF THE EMBODIMENTS

The remainder of the description presents embodiments of the invention in a communication network. This network may be implemented in a fixed or mobile infrastructure, and the invention may be intended to control an industrial process, a service delivery process or any other process linked to the provision of an offering to a client or for the specific needs of the business deploying it.

Figure 1:
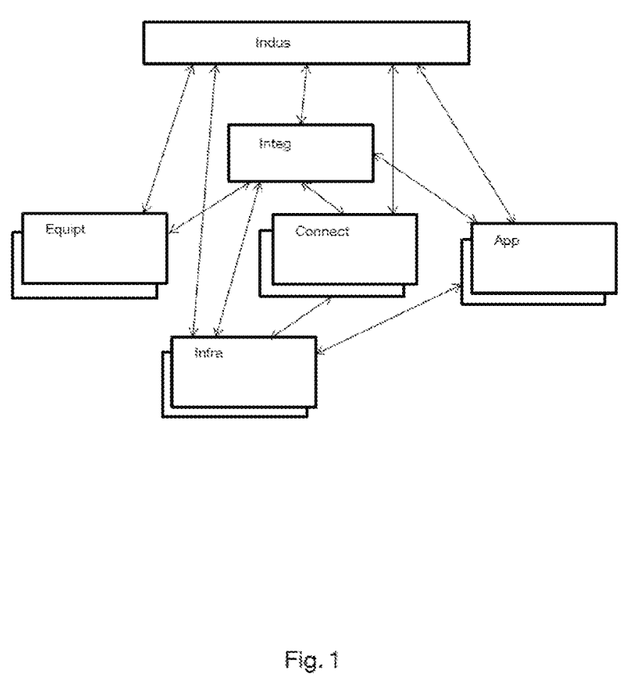
FIG. 1 shows a simplified view of an environment in which the invention is implemented, according to one aspect of the invention.

Reference is made first of all to FIG. 1, which shows a simplified view of an environment in which the invention is implemented, according to one aspect of the invention. In this environment, a company Indus produces an industrial product based on a process requiring a plurality of parties to contribute. The process, also called business process, is defined as a set of tasks performed by the various parties, the control of the implementation of the process leading to the production of the industrial product being based on the supervision of each of the tasks of the process. The various parties however do not necessarily know about the industrial product and, according to the prior art, transmit supervision data specific to their environment, and not specific to the monitoring of the process of producing the industrial product produced by Indus. According to one aspect of the invention, the company Indus interacts with an integrator Integ responsible for monitoring and articulating the various tasks of the process and for advancing the tasks that make it possible to produce the product. In some cases, the company Indus also takes on the role of integrator. Implementing the process furthermore requires the contribution of at least one industrial equipment supplier Equipt responsible for implementing equipments that make it possible to manufacture the industrial product. At least one business application supplier App is also involved in the process. These applications may correspond for example to servers responsible for analyzing operating data of the industrial equipments. At least one infrastructure supplier Infra, for example Cloud infrastructure supplier, is also likely to be involved, in particular in order to store applications and data relating to the process. The progress of the process furthermore requires at least one connectivity supplier Connect that ensures that the various data relating to the steps of the process are transmitted between the various parties involved in the process. Like the other parties, according to the prior art, the connectivity supplier supervises the connectivity service independently of the process for which it transmits data. The connectivity supplier Connect ensures for example that the data that it routes do not experience packet losses, that the quality of service classes are actually complied with for the various data flows that are routed, that the data for a given client are correctly metered and invoiced where applicable, that commitments in terms of security for a client are actually complied with but the connectivity supplier Connect, according to the prior art, does not control the data specific to the process of manufacturing the product. In the environment of FIG. 1, according to one aspect of the invention, the connectivity supplier Connect controls the data flows specific to the manufacturing process based on a request transmitted by a supervision device of the party Indus or even of the party Integ, as the case may be. According to other examples, a supervision device of the parties Equipt, App, Infra may also transmit a control request to an equipment of the party Connect, for example in order to correlate the control information of the entity Connect with their own control of data of the manufacturing process. It should be noted that the entities Equipt, App, Infra or even Integ also have communication networks and may implement the control method according to the invention in the same way as the party Connect.

Figure 2:
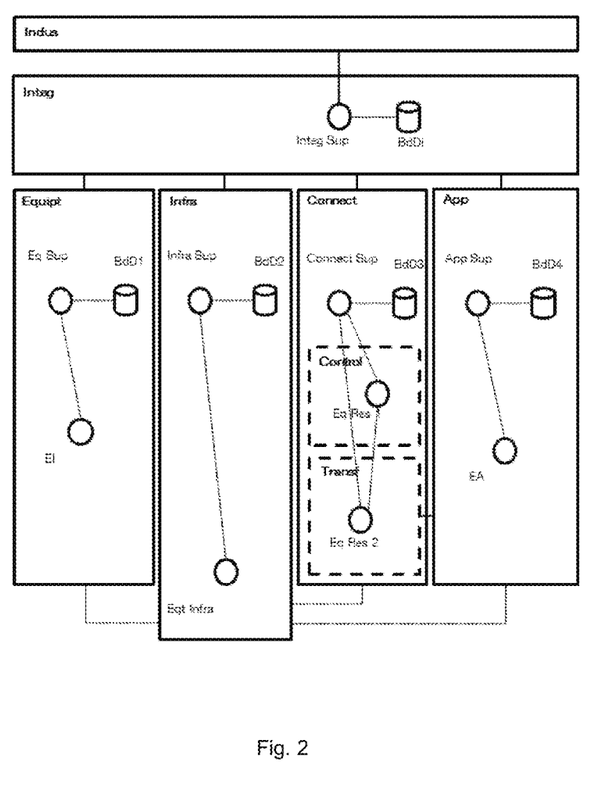
FIG. 2 shows a logical architecture of an environment in which the invention is implemented, according to another aspect of the invention.

With reference to FIG. 2, what is presented is a logical architecture of an environment in which the invention is implemented, according to another aspect of the invention. The various parties involved in the process as described in FIG. 1 are also involved in the process of FIG. 2. The parties Indus, Integ, Equipt, Infra, Connect and App are thus shown. It should be noted that one and the same structure may take on the role of one or more parties. For example, one and the same structure or business may be involved both as Integ and as Connect, for example. Each party has at least one supervision entity. The party Integ thus administers a supervision entity Integ Super, the party Equipt manages the supervision entity Eq Sup, and, in the same way, the parties Infra, Connect and App respectively administer the entities Infra Sup, Connect Sup and App Sup. The supervision entities of the various parties control the operation of the devices specific to the party. The entity Eq Sup thus controls the operation of an industrial equipment EI. Of course, the supervision entities are each able to control more than one device, FIG. 2 showing just one for each supervision entity. The entities Infra Sup, Connect Sup and App Sup respectively control the operation of the devices Eqt Infra, (Eq Res 1 and Eq Res 2), and the application equipment EA. It should be noted that the entity Connect Sup controls the operation of the equipments Eq Res 1 and Eq Res 2, the device Eq Res 1 being involved in the control plane Contrl and the device Eq Res 2 being involved in the transfer plane Transf of the communication network managed by the party Connect. Each supervision entity is furthermore connected to a database (BdD1, BdD2, BdD3 and BdD4) in order to store the data resulting from the control operation performed on the respective equipments by the supervision entities. The party Integ has a database BdDi that incorporates the various data resulting from the control operations performed by the parties Equipt, Infra, Connect, App. In this logical architecture, a supervision entity is able to call upon the devices of the communication network involved in implementing the process and transmits information identifying a process to be controlled. The devices that are called upon configure one or more control parameters relating to the identified process and execute the control operations on the basis of the configured parameters. Thus, for example, the network equipments Eq Res 1 and Eq Res 2 receive identifiers of flows to be controlled, configure control parameters for controlling the data flows of a process, and perform the control operation. The device Eq Res 1 thus controls data specific to a process in the control plane Control and the device Eq Res 2 controls data routed in the transfer plane Transf of the network of Connect for the process identified by the information transmitted previously by the entity Connect Sup. It should be noted that a supervision entity of a party may transmit the information identifying the process to devices of other parties involved in the process. The entity Integ Sup may thus transmit a process identifier directly or indirectly to the devices Eq Res 1 and Eq Res 2 so that these control the process identified by the transmitted identifier. In the knowledge that the data flows transit in one and the same data path, that this data path may be a network slice, a private virtual network, a leased line or any other technique for aggregating or multiplexing data relating to different clients or processes, the process identifier makes it possible to be able to control only data specific to the process. This makes it possible to be able to use said data directly or to be able to aggregate them more easily in order to transmit them for example to the party Indus, each party involved in the process possibly implementing the same control method.

Figure 3:
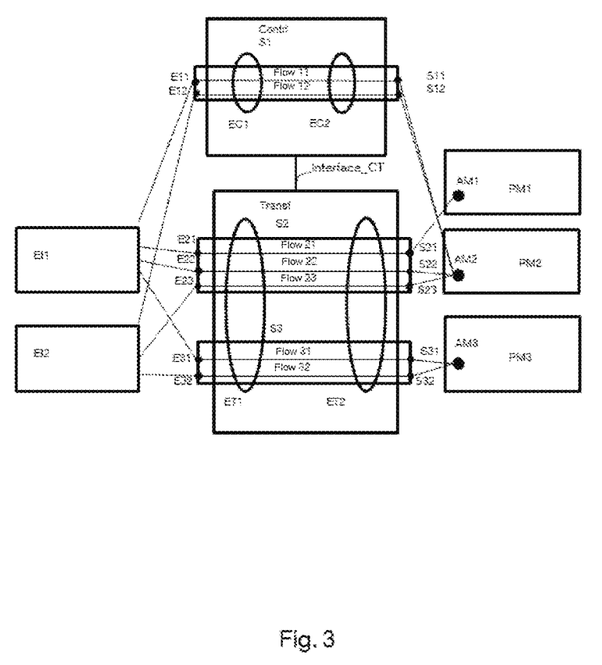
FIG. 3 shows an architecture of a communication network in which the invention is implemented, according to a first embodiment of the invention.

With reference to FIG. 3, what is shown is an architecture of a communication network in which the invention is implemented, according to a first embodiment of the invention. In this embodiment, three industrial business processes PM1, PM2, PM3 are controlled. By way of example, the three processes are, respectively, a process PM1 of ordering a product, a process PM2 of manufacturing a product and a process PM3 of transporting the manufactured product within a factory. These three processes PM1, PM2, PM3 require data exchanges between various equipments, various teams and various business applications. The process PM1 thus requires data exchanges between an industrial equipment EI1 for taking orders and a business application AM1 for managing orders, this equipment EI1 and this business application AM1 exchanging a data flow Flow 21 on a network slice S2 of the transfer plane Transf of a communication network. The data flows Flow 22 and Flow 23 respectively exchanged between the equipments EI1 and EI2 and the business application AM2 on the network slice S2 of the transfer plane Transf of the communication network, and the data flows Flow 11 and Flow 12 transmitted by the equipments EI1 and EI2 on a network slice S1 of the control plane Contrl of the communication network are specific to the business process PM2. The data flows Flow 31 and Flow 32 transmitted by the equipments EI1 and EI2 on a slice S3 of the transfer plane Transf of the communication network to the business application AM3 relate to the business process PM3. Some data flows may be exchanged indiscriminately between business applications or physical or virtualized equipments. In this embodiment, the transfer plane Transf comprises two network slices S2 and S3 established between the network devices ET1 and ET2, while the control plane Contrl comprises a network slice S1 implemented from the devices EC1 and EC2. The data flows transmitted in these network slices are specific to separate processes, and it is therefore necessary to put in place the control method to control the data flows associated with the respective processes. For example, the configuration of a data flow control parameter, such as a field for the quality of service of the flow, a number of packets transmitted for a flow or a duration of the control operation that is performed is implemented based on information identifying the flow to be controlled. This information, transmitted by a supervision entity, not shown in FIG. 3, corresponds to the number of the flow, for example Flow 11, Flow 12, etc., or else to input attributes (E11, E12, E21, E22, E23, E31, E32) and/or output attributes (S11, S12, S21, S22, S23, S31, S32) of the data flows. The data flow Flow 11 may thus be identified by Flow 11, E11-S11 or else by these identifiers plus a slice identifier (Flow 11, S1), (Flow 11, E11-S11, S1) depending on whether the data flow is on an uplink (from a terminal to a server) or downlink (from a server to a terminal) within the connectivity infrastructure Connect. An identifier of an equipment routing the data of the flow (EC1, EC2, etc.) and the type of plane (Control, Transfer) may furthermore be used to identify the flow or be added to the parameters defined above. The identifier of Flow 11 may for example comprise a datum from among the following data in addition to the identifier Flow 11 (E11, E12, S1, Contrl, EC1, EC2). An identifier of the supervision entity (such as for example Integ Sup or Connect Sup according to FIG. 2) transmitting the information about the identifier of the flow to be controlled may furthermore be added to the flow identifier (Flow 11) for identification purposes. In this embodiment, the shared data path is a network slice.

Figure 4:
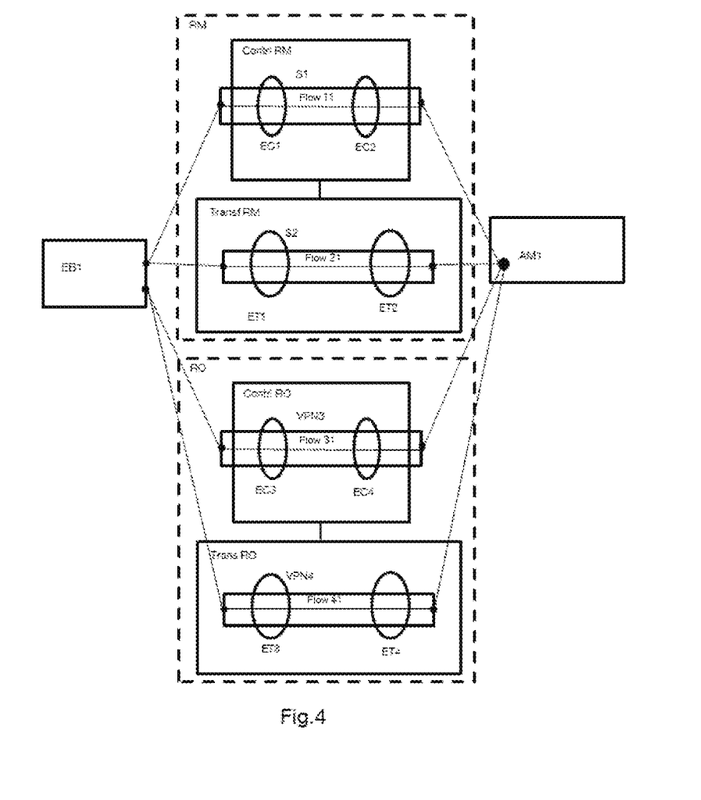
FIG. 4 shows an architecture of a communication network in which the invention is implemented, according to another, second embodiment of the invention.

With reference to FIG. 4, what is shown is an architecture of a communication network in which the invention is implemented, according to a second embodiment of the invention. This embodiment relates to a process of a banking service that requires high availability. The communication network consists of a mobile communication network RM and an optical communication network RO, the two networks being intended to ensure high availability of the banking service. Each network RM and RO has a control plane, respectively denoted Contrl RM and Contrl RO, and a transfer plane, Transf RM and Transf RO. The data flows specific to the banking service, transported from the banking equipment EB1 to the business application AM1, take different data paths, each path being a shared path. The control flow Flow 11 is routed in the path shared between the devices EC1 and EC2 and corresponding to a network slice S1 of the control network Contrl RM of the mobile network RM, the transfer data flow Flow 21 is routed in a network slice S2, between the devices ET1 and ET2, of the transfer network Transf RM of the mobile network RM. The control and transfer data flows Flow 31 and Flow 41 of the optical network RO are respectively routed in VPN3 (for virtual private network) constructed between the network devices EC3 and EC4, and VPN4 constructed between the devices ET3 and ET4 of the optical network RO. The flows of one and the same process may be routed in separate or common shared paths. In FIG. 4, various data flows Flow 11, Flow 21, Flow 31, Flow 41 are routed in separate shared paths of different types, since they are network slices for Flow 11 and Flow 21, while they are VPNs for Flow 31 and Flow 41. The various flows may be identified in accordance with the options outlined in the description of FIG. 3. In FIG. 4, a single process is shown, but the shared data paths (S1, S2, VPN3 and VPN4) may each comprise a plurality of flows of one and the same process and/or separate processes. A control parameter is configured for each flow (Flow 11, Flow 21, Flow 31, Flow 41) of the process. This may be a datum of a flow to be controlled, for example for counting the packets of the flow, a period for which the flow is controlled. The control operation may thus be carried out for a limited period in order to solve a specific problem. The control parameter may comprise a frequency of the control operation when this involves for example reading an indicator several times within a time period. It may also involve a mode of computing control data, for example gathering instantaneous values or average values. The control parameter may also comprise a synchronization datum, such as a clock, that makes it possible for example to synchronize the control information received from separate flows of a process as is the case for flows Flow 11, Flow 21, Flow 31 and Flow 41, and to be able to interpret the various control data obtained at a given time when controlling the various flows of the process.

Figure 5:
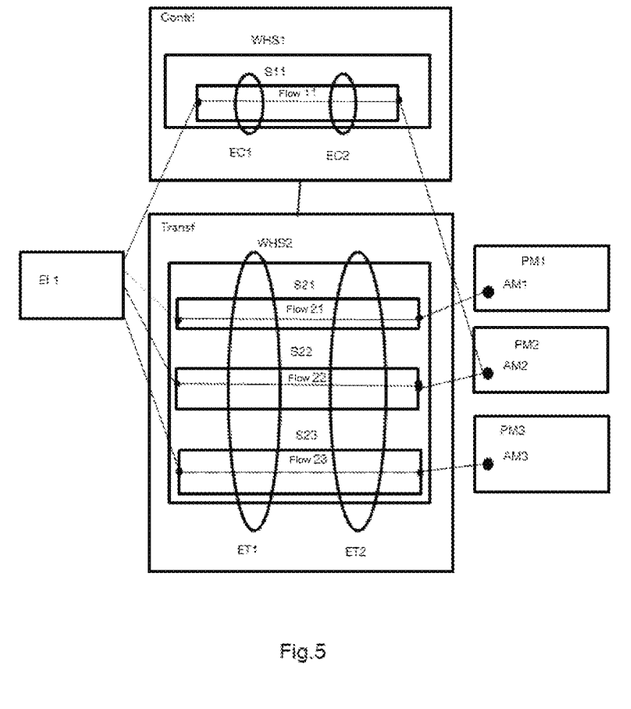
FIG. 5 shows an architecture of a communication network in which the invention is implemented, according to another, third embodiment of the invention.

In connection with FIG. 5, what is shown is an architecture of a communication network in which the invention is implemented, according to a third embodiment of the invention.

This embodiment falls within the context of a wholesale offering of an operator of a communication network to a provider deploying processes for its needs and/or itself offering services to clients, liable to be generated by processes, on the basis of the wholesale offering contracted to the operator.

The network operator routes the transfer data from the provider in a slice WHS2, comprising the devices ET1 and ET2, of the transfer plane Transf. The control data of the provider are routed in a slice WHS1 of the control plane Contrl of the communication network, comprising the devices EC1 and EC2. The devices ET1, ET2, EC1 and EC2 contribute to implementing at least one network slice and a number greater than two of devices may be contemplated for a given network slice. A second provider contracting a wholesale offering to the same operator will have its data routed in two slices, not shown in FIG. 5, separate from the slices WHS1 and WHS2. The provider implements three processes from one and the same industrial equipment EI1, each of the processes generating data flows to the respective business applications AM1, AM2, AM3. Each data flow is routed in the transfer plane Transf in a network slice of the slice WHS2. Data Flow 21 of the process PM1 exchanged between the equipment EI1 and the business application AM1 is thus routed on a network slice S21 of the network slice WHS2. In the same way, data Flow 22 and data Flow 23 are routed on the slices S22 and S23 of the slice WHS2. Flow 11 of the control plane Contrl of the process PM2 is routed on the slice WHS1. In this embodiment, the data flows are associated with network slices, which are themselves contained within a network slice, forming a hierarchy of network slices. Indeed, the data flows of a process are associated with network slices established within the network slice forming a shared data path. Depending on the processes and the number of parties involved in implementing these processes, a number greater than two of network slice levels may be contemplated. This hierarchy may be implemented based on other sharing techniques, such as VPNs or leased lines, and it is also possible to contemplate a mixed architecture comprising a hierarchy of shared data paths based on different technologies (network slice in a VPN for example).

Figure 6:
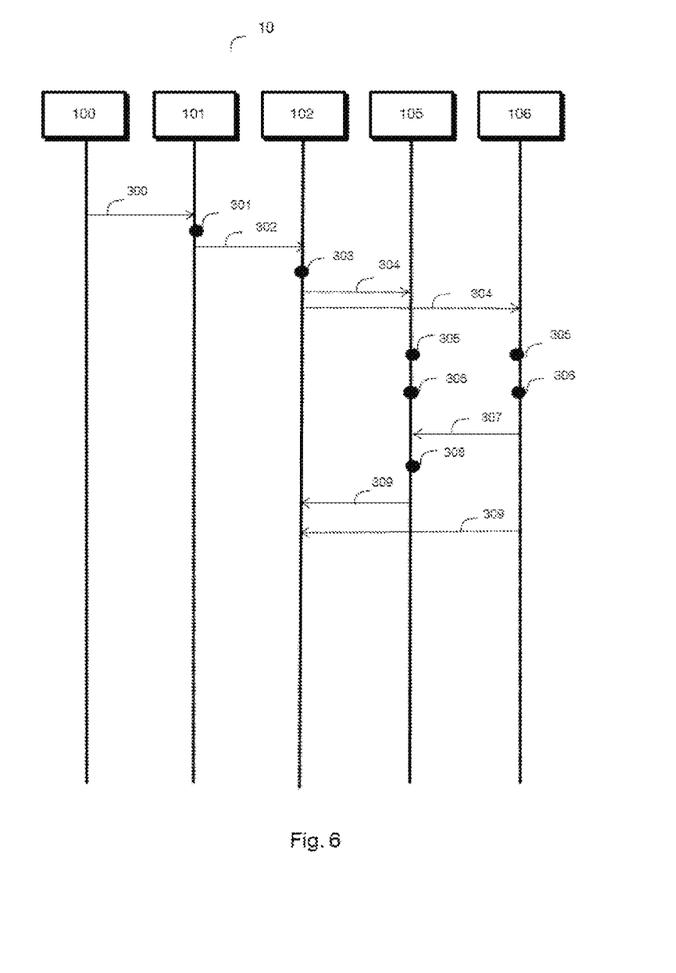
FIG. 6 shows an overview of the control method according to a fourth embodiment of the invention.

With reference to FIG. 6, what is shown is an overview of the control method according to a fourth embodiment of the invention, implemented in a communication network 10.

In a step 300, a client 100, for example an industrial one, asks a process management device 101 to control a business process involving various equipments, or even various parties, and generating data exchanges between industrial equipments and/or computer applications. This calling upon the management device 101 is optional, and the client 100 may call directly upon the supervision device 102 if it knows the device 102 in charge of controlling the process.

In a step 301, the management device 101 identifies the supervision device to be contacted in order for the process to be controlled. This identification is performed for example based on a process identifier, and/or a description of the process, and/or a table associating processes and supervision devices. In a step 302, the management entity 101 transmits, to the supervision entity 102 identified in step 301, a request to control data relating to the flow of the process to be controlled. If multiple parties are involved in the process, the entity 101 may identify and call upon multiple supervision entities. The exchanges between the entity 101 and the entity 102 may be performed using an HTTP (HyperText Transfer Protocol) or SNMP (Simple Network Management Protocol) protocol, or else using a specific protocol. In step 302, the entity 101 may also indicate to the entity 102 the data collection frequency of control data, the availability rate of the devices of the connectivity infrastructure or applications specific to the process, along with other information able to determine the type of control operation and the parameters of this control operation. In a step 303, the supervision entity 102 determines the devices to be called upon in order to control the data of the process in accordance with the request received from the management entity 101 or the client 100. To determine the equipments, the supervision entity 102 may use a table that associates processes with data flows. For example, the entity 102 holds a table that associates processes with network slice identifiers and possibly with shared path identifiers, such as a network slice or VPN identifier. The entity 102 may also hold a table that associates processes and devices routing data of processes, and it may also associate a type of process (IoT (Internet of Things), streaming, best effort, etc.) with identifiers of devices involved in transporting data of these types of process. For example, when a new process is implemented by a client, said client indicates to the operator in charge of the supervision device 102, the types of flow generated by the process and their characteristics (quality of service, data rate, criticality, location of the equipments and applications generating the data of the flow, etc.) and the operator in charge of routing the data assigns one or more data paths in which the data flows of the process will be routed according to the characteristics of these flows. Based on this identification of the one (or more) paths, the operator identifies the devices of the one (or more) paths involved in routing the data of the one (or more) flows. The information identifying the data flow to be controlled comprises a process identifier identifying a process generating the data of the flow, and optionally at least one identifier from among:

an identifier of the shared data path, such as the network slice or VPN identifier,
an identifier of the device performing the control operation, such as the identifier 105 or 106,
an identifier of the supervision entity, such as the identifier 102 of the supervision entity.

In step 304, the supervision entity 102 transmits, to the devices 105 and 106 identified in step 303, information identifying a flow to be controlled. The identification information comprises the identifiers described above. According to one alternative, the supervision entity 102 furthermore transmits flow control parameters to the devices 105 and 106. These parameters are intended to classify the control operation and define which parameters of the flow are to be configured by the equipments 105 and 106 in order to perform the control operation. The control parameters for the flows transmitted to the devices 105 and 106 may be different depending on the role held by the device in the routing of data. For example, if the device 105 is involved in routing the control flows and the device 106 is involved in routing transfer data, the control parameters may be different. The control parameters as described in FIG. 3 may thus be transmitted, according to one example, by the supervision entity 102 to the devices 105 and 106 in step 304.

In step 305, the devices 105 and 106 configure one or more control parameters for the data flow generated by the process to be controlled. The control parameter to be configured may have been transmitted by the supervision entity 102 in step 304, or else it may involve configuration parameters determined by the devices 105 and 106 based in particular on data of the process to be controlled. For example, based on the identifiers of the flow to be controlled, the devices 105 and 106 may determine the control parameters to be configured. If they are critical flows of a process, the devices may for example configure computation of the packet loss rate. If real-time data flows are involved, the devices may configure regular monitoring of the quality of service parameters of the packets. If confidential processes are involved, the devices may configure control of integrity parameters for the packets of the data flow. In the case of encrypted data flows, an application device may access the data, while a router of the communication network will not necessarily have keys for decrypting the encrypted data flow. The devices 105 and 106 may therefore configure separate control parameters, but however it may be necessary to synchronize these control operations by configuring for example a common clock that identifies the time when the control operations have to be performed by the two devices 105 and 106.

In step 306, the devices 105 and 106 control the data flow in accordance with the control parameter configured in step 305. If the process comprises multiple data flows, each flow may be controlled with control parameters specific to the flow of the process. The control parameters, according to one example, are therefore specific to the data flow and/or to the device in charge of controlling the flow, in addition to being specific to the process.

According to one example, the control operation executed in step 306 comprises an operation of correlating a control operation performed on a second flow with a result from the control operation on the flow to be controlled. For example, the device 105 may route data resulting from a plurality of flows of one and the same process or separate processes. The transmission of the data of a flow may influence the transmission of the data of another flow, or a problem detected on two separate flows may make it possible to identify a problem on the device 105, for example. In particular, if all of the data flows routed by the device 105 experience a quality of service degradation or packet loss, then this may indicate a problem with the device 105. The possibility of correlating, comparing or aggregating control results makes it possible to identify a problem more easily.

According to one alternative, in step 307, the device 106 of the data path transmits, to the device 105, a message comprising information taken into account by the device 106 in order to configure a control parameter. This condition may correspond to a result of a control operation that the device 106 performed on the data flow during a previous control operation or during the control operation being performed. For example, if the device 106 detects a packet loss, it may indicate this information so that the device 105 also configures the packet loss control parameter. It may also involve a synchronization datum so that the control operations by the devices 105 and 106 are performed at the same time. According to one example, this information is transmitted by the entity 106 via the supervision entity 102 in order to address the situation in which the devices of the data path do not know one another or are not able to exchange data directly.

According to another alternative, in step 308, the device 105 reconfigures one or more control parameters for the data flow. This reconfiguration, according to one example, follows the information received in step 307 and/or results from the control operation performed autonomously by the device 105. Thus, if the device 105 detects an abnormal variation in a quality of service parameter, it may reconfigure control parameters for example in order to control other fields of the protocol used to transmit the data of the flow of the process. According to another alternative, the devices 105 and 106, in a step 309, transmit a result of the control operation executed on the data flow in accordance with configured control parameters. This result may allow the supervision entity 102 to determine a new control operation to be performed on the same data flow or on a separate flow of the process, and also to inform the management entity 101 and possibly the client 100 of the obtained control results. In the case of a periodic control operation, the supervision entity 102 may save the results obtained in order to evaluate the evolution of the routing of the data of the flow of a process in a shared path of the communication network.

Figure 7:
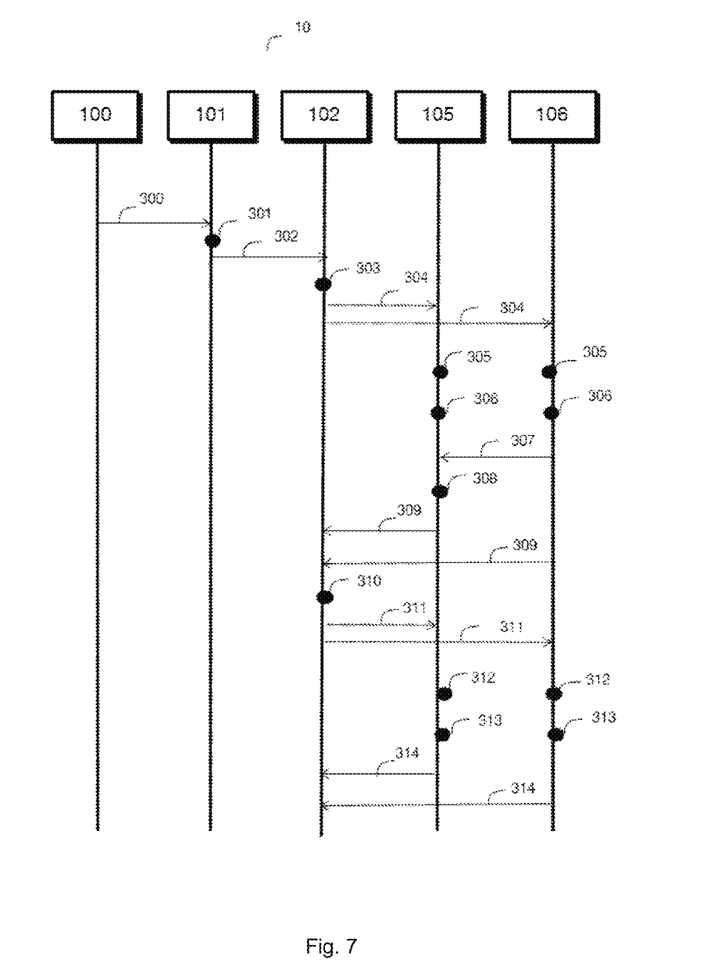
FIG. 7 shows an overview of the control method according to a fifth embodiment of the invention.

With reference to FIG. 7, what is shown is an overview of the control method according to a fifth embodiment of the invention in a communication network 10. The architecture of the communication network in which this embodiment is implemented is the one shown in FIG. 3.

Two industrial equipments EI1 and EI2 are connected to the control plane and to the transfer plane of a mobile communication network.

The control plane consists of two network equipments EC1 and EC2; the transfer plane consists of two network equipments ET1 and ET2.

The transfer plane Tranf and control plane Contrl are interfaced so as to allow in particular the transfer plane to be configured by the control plane. This interface "Interface_CT" typically corresponds to the N4 interface of the 3GPP for the "Service-based Architecture" architecture of the 5GC (5G Core) core network. Data flows are created depending on the nature of a business process (associated with the business application). There are therefore flows that relate to the control plane and flows relating to the transfer plane. Typically, in order to supervise events relating to the attachment of an industrial equipment to the network or to its mobility, at least one flow will be created in the control plane. Thus, the flows (of the transfer plane and of the control plane) are determined based on the nature of the business process (associated with the business application) and while considering the industrial equipment involved in this business process. For each flow (of the transfer plane of the control plane), there is therefore a single input attribute and a single output attribute.

According to this example, as shown in FIG. 3,
for the control plane: for each industrial equipment that initiates communication with the control plane, at least one flow is created, with which there are associated a single input attribute and a single output attribute in the supervision entity of the connectivity supplier. In this case, it will be assumed that the control plane:
i) is common for all of the industrial equipments (EI1 and EI2) of the industrial tool of the client
ii) is implemented via a single slice S1. For this slice S1, the flow Flow 11 and the two identifiers E11 and S11 are created as input and output attributes for the industrial equipment EI1,
the flow Flow 12 and the two identifiers E12 and S12 are created as input and output attributes for the industrial equipment EI2.

The flows Flow 11 and Flow 12 participate in the business process PM2 in relation to exchanges of IoT data. Flow 11 and Flow 12 then make it possible to provide information about the state of attachment to the network for the industrial equipments EI1 and EI2 during the supervision of the business process PM2. For the transfer plane, the industrial equipment EI1 participates in three business processes PM1, PM2 and PM3. Connectivity to the transfer plane is implemented via two slices of the communication network S2 and S3 in order to distinguish the nature of the data transferred via the mobile communication network. The slice S2 is used to exchange IoT data between the industrial equipments and the business applications AM1, AM2, AM3. The slice S3 is used to manage updates to the software of each industrial equipment. Typically, the slice S3 will demand more bandwidth than the slice S2, and the slice S2 will have more continuous traffic than the network slice S3. The flows of the transfer plane are determined based on the nature of the business process (associated with the business application) and by considering the industrial equipment involved in this business process. For each flow of the transfer plane, there is then a single input attribute and a single output attribute.

Although the business processes PM1 and PM2 may have similar requirements in terms of properties of the transfer plane (traffic volume, connectivity or latency speed level, connectivity availability level, etc.), differentiating them, by implementing different flows, allows different configuration of the control parameters that will have to be fed back by the network device for each business process.

In this embodiment, it is considered that the business process IoT PM1 of the business application AM1 is more critical than the business process IoT PM2 of the business application AM2. In this case, the network equipments ET1 and ET2 will be configured such that:
the performance metrics of Flow 21 (such as the number of packets transferred via the slice S2 being transmitted to the supervision entity every 10 minutes (not shown in FIG. 3 and possibly being the entity Connect Sup described in FIG. 2), the performance metrics of Flows 22 and 23 (such as the number of packets transferred via the slice S2 being transmitted to the supervision entity every 30 minutes.

The control parameter that is configured is thus the frequency of feeding back of the performance metrics, and will be determined depending on the requirements of the business process to be supervised.

The control parameters associated with the various flows of the business processes, the nature of the interfaces used to execute control operations of which are shown in connection with the steps of FIG. 7. Only the steps calling upon the supervision entity or a device of the communication network in charge of executing the control operation are described, except for the initial step 300.

Step 300: The client entity 100 transmits, to a management entity 101, the list of business processes to be supervised and the overall performance expected for each business process. The following data are thus transmitted:

{Business Process: PM1; volume of packets to be transferred: 2 Mbits/hour; frequency of feeding back performance metrics to the supervision tool: 10 minutes}
{Business Process: PM2; volume of packets to be transferred; 2 Mbits/hour; frequency of performance monitoring: 30 minutes}
{Business Process: PM3; packet loss rate: 0%; frequency of performance monitoring: at the end of each complete transfer}

Step 302: sending, to the supervision entity 102, identifiers of the devices in charge of the control operation, the list of industrial equipments and the performance expected per business process. Sending the following data:

{Business Process: PM1; Industrial equipment: EI1; volume of packets to be transferred: 2 Mbits/hour; frequency of performance monitoring: 10 minutes}
{Business Process: PM2; Industrial equipment: EI1, EI2; volume of packets to be transferred: 2 Mbits/hour; frequency of performance monitoring: 30 minutes}
{Business Process: PM3; Industrial equipment: EI1, EI2; packet loss rate: 0%; frequency of performance monitoring: at the end of each complete transfer}

Step 304: sending, to the devices 105 representing ET1 and 106 representing ET2, information identifying the flows to be controlled and control parameters relating to the performance metrics that have to be executed and then transmitted by the device for each flow.

In this step, the manager sends the control parameters for the expected performance metrics to each device of the communication network involved in the transmission of data of the flow to be controlled that it supervises.

For the control plane, the identifiers of flows Flow 11 and Flow 12 and of control parameters are transmitted to the equipments EC1 and EC2 in order to manage the flows Flow 11 and Flow 12. The devices EC1 and EC2 are not shown in FIG. 7. For the transfer plane, the flow identifiers and control parameters are transmitted to the equipments 105 ET1 and 106 ET2 in order to manage the flows Flow 21, Flow 22, Flow 23, Flow 31 and Flow 32.

The following three examples relate to the flows Flow 21, Flow 22 and Flow 23 for the device 105 ET1 of the transfer network Transf. The identical data are transmitted to the device 106. It should be noted that it is proposed to use:

i) the streaming interface to supervise flows requiring frequent feedback of performance metrics by the network device in question and ii) the file transfer interface in the opposite case, that is to say to supervise flows not requiring frequent feedback.

The following information is thus transmitted to the device 105 ET1 in step 304:

{Network Equipment: ET1; Flow: Flow 21, Input attribute: E21; Output attribute: S21; Industrial equipment: EI1; volume of packets to be transferred: 2 Mbits/hour; frequency of performance monitoring: 10 minutes; value: instantaneous values; interface: streaming interface}
{Network Equipment: ET1; Flow: Flow 22, Input attribute: E22; Output attribute: S22; Industrial equipment: EI1; volume of packets to be transferred: 2 Mbits/hour; frequency of performance monitoring: 30 minutes; value: averaged values; interface: file transfer}
{Network Equipment: ET1; Flow: Flow 23, Input attribute: E23; Output attribute: S23; Industrial equipment: EI2; volume of packets to be transferred: 2 Mbits/hour; frequency of performance monitoring: 30 minutes; value: averaged values; interface: file transfer}

As soon as an industrial equipment EI connects to the communication network and communicates with one of the domains of the business applications of a business process, then the supervision entity fills in, in particular in a database of its technical domain, the input and output attributes of the flow with, respectively: the IP address allocated to the industrial equipment and the IP address used by the business application to communicate with this industrial equipment.

Steps 305 to 309 are analogous to the identical steps of FIG. 6.

Step 310: the supervision entity 102 detects a problem on the data flow of the business process PM1 and the performance monitoring should now be configured to 10 seconds (and no longer 10 minutes).

Step 311: notification by the supervision entity 102 to the devices 105 ET1 and 106 ET2 in question of the identified business process requesting coordinated supervision.

Indeed, implementing the business process PM1 involves the equipments 105 ET1 and 106 ET2 in the network. The supervision entity 102 then sends the two control parameter reconfiguration commands for the flow Flow 21 of the process PM1 to the devices 105 ET1 and 106 ET2, respectively:

{Network Equipment: ET1; Flow: Flow 21, Input attribute: E21; Industrial equipment: EI1; volume of packets to be transferred: 2 Mbits/hour; frequency of performance monitoring: 10 seconds; value: instantaneous values; interface: streaming interface}
{Network Equipment: ET2; Flow: Flow 21; Output attribute: S21; Industrial equipment: EI1; volume of packets to be transferred: 2 Mbits/hour; frequency of performance monitoring: 10 seconds; value: instantaneous values; interface: streaming interface}

Steps 312 to 314 correspond to steps 305, 306, 309 described above with the control parameters modified in step 310.

Figure 8:
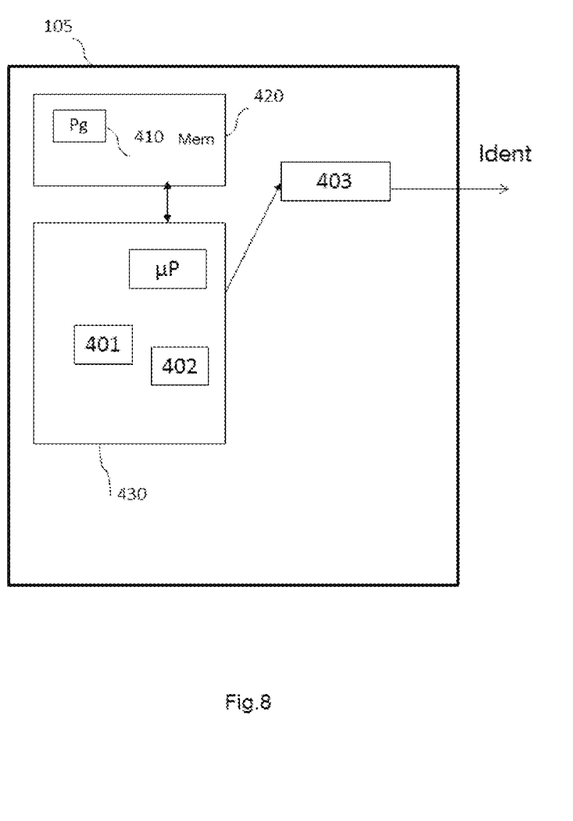
FIG. 8 shows one example of a structure of a control device according to one aspect of the invention.

With reference to FIG. 8, what is shown is one example of a structure of a control device according to one aspect of the invention.

The control device 105 implements the control method, various embodiments of which have just been described.

Such a device 105 may be implemented in an entity of a communication infrastructure, in a virtualized infrastructure or in an infrastructure based on physical equipments. For example, the device may be implemented in a network equipment entity such as a router or application server.

For example, the device 105 comprises a processing unit 430, equipped for example with a microprocessor μP, and driven by a computer program 410, stored in a memory 420 and implementing the determination method according to the invention. On initialization, the code instructions of the computer program 410 are for example loaded into a RAM memory, before being executed by the processor of the processing unit 430.

Such a device 400 comprises:
- a receiver 403, able to receive, from a supervision entity, information Ident identifying the flow to be controlled,
- a configuration module 401 able to configure a flow control parameter, said parameter relating to the process corresponding to the received information,
- a controller 402, able to execute an operation of controlling the data flow on the basis of the configured parameter.

The invention claimed is:

1. A control method comprising:
controlling a flow of data associated with a process comprising a plurality of services, the flow of data corresponding to a service of the plurality of services being routed in a shared data path, comprising a plurality of flows of data, of a communication network, the shared data path corresponding to a network slice, and said controlling being implemented in a device of said path and comprising:
receiving, from a supervision entity, information identifying the flow of data to be controlled, the information identifying the flow of data corresponding to the service of the process to be controlled comprising a process identifier and an identifier of the network slice;
configuring at least one flow control parameter, said parameter relating to the process corresponding to the received information; and
executing an operation of controlling the flow of data on the basis of the configured at least one flow control parameter.

2. The control method as claimed in claim 1, in which the at least one flow control parameter is obtained from the supervision entity prior to the device configuring the at least one flow control parameter.

3. The control method as claimed in claim 1, in which the at least one flow control parameter comprises at least one parameter from among:
a field of a datum of the flow,
a period for which the flow control is executed,
a frequency corresponding to the number of iterations of the control operation per time unit,
a mode of computing the control data,
a type of interface used to perform the control operation,
a datum for synchronizing control operations.

4. The control method as claimed in claim 1, furthermore comprising transmitting a result of the executed control operation to the supervision entity.

5. The control method as claimed in claim 1, furthermore comprising receiving, from another device of the shared data path, a message comprising information taken into account by the other device in order to configure the at least one flow control parameter.

6. The control method as claimed in claim 1, in which the control operation comprises an operation of correlating a result of a control operation performed on a second data flow with a result from the control operation on the flow of data to be controlled.

7. The control method as claimed in claim 6, in which the second data flow is routed in a control plane of the communication network and the flow of data to be controlled is routed in a transfer plane of the communication network.

8. The control method as claimed in claim 1, in which the flow of data to be controlled is transmitted in the network slice established in the shared data path.

9. The control method as claimed in claim 1, furthermore comprising reconfiguring at least one of the at least one flow control parameter following the execution of the operation of controlling the flow of data to be controlled.

10. The control method as claimed in claim 1, in which the information identifying the flow of data further comprises at least one identifier from among an identifier of the shared data path, an identifier of the device, and an identifier of the supervision entity.

11. The control method as claimed in claim 1, wherein the configured least one flow control parameter relating to the process associated with the flow of data differs from a corresponding flow control parameter configured for another flow of data of the plurality routed in the shared data path corresponding to the same network slice and associated with another process.

12. A control device for controlling a flow of data associated with a process and routed in a shared data path, comprising a plurality of flows of data of a communication network, the shared data path corresponding to a network slice, the control device being implemented in a device of said path and comprising:
a receiver, able to receive, from a supervision entity, information identifying the flow of data to be controlled, the flow of data to be controlled being associated with a process comprising a plurality of services, the flow of data to be controlled corresponding to a service of the plurality of services being routed in the shared data path, the information identifying the flow of data corresponding to the service of the process to be controlled comprising a process identifier and an identifier of the network slice; and
a processing unit comprising at least one processor and a non-transitory computer-readable medium comprising instructions stored thereon which when executed by the processor configure the processing unit to:
configure a flow control parameter, said flow control parameter relating to the process corresponding to the received information, and
execute an operation of controlling the flow of data on the basis of the configured flow control parameter.

13. A control system comprising:
a control device for controlling a flow of data associated with a process comprising a plurality of services, the flow of data corresponding to a service of the plurality of services being routed in a shared data path, comprising a plurality of flows of data of a communication network, the shared data path corresponding to a network slice, and the control device being implemented in a device of said shared data path and comprising:
a receiver, able to receive, from a supervision entity, information identifying the flow of data to be controlled, the information identifying the flow of data corresponding to the service of the process to be controlled comprising a process identifier and an identifier of the network slice; and
a processing unit comprising at least one processor and a non-transitory computer-readable medium comprising instructions stored thereon which when executed by the at least one processor configure the processing unit to:

configure a flow control parameter, said flow control parameter relating to the process corresponding to the received information, and execute an operation of controlling the flow of data on the basis of the configured flow control parameter, and the supervision entity, which is configured to transmit the information identifying the flow of data to be controlled to the control device.

14. A non-transitory computer-readable recording medium on which is recorded a program comprising instructions which when executed by a processor of a control device configure the control device to implement a method of controlling a flow of data associated with a process and routed in a shared data path, comprising a plurality of flows of data, of a communication network, the shared data path corresponding to a network slice, and said method comprising:

receiving, from a supervision entity, information identifying the flow of data to be controlled, the flow of data to be controlled being associated with a process comprising a plurality of services, the flow of data to be controlled corresponding to a service of the plurality of services being routed in the shared data path, the information identifying the flow of data corresponding to the service of the process to be controlled comprising a process identifier and an identifier of the network slice;

configuring at least one flow control parameter, said at least one flow control parameter relating to the process corresponding to the received information; and executing an operation of controlling the flow of data on the basis of the configured at least one flow control parameter.

* * * * *